Feb. 20, 1962     W. E. STUPAR     3,022,500
TRIGONOMETRIC CONVERTER
Filed Jan. 13, 1958     7 Sheets-Sheet 1
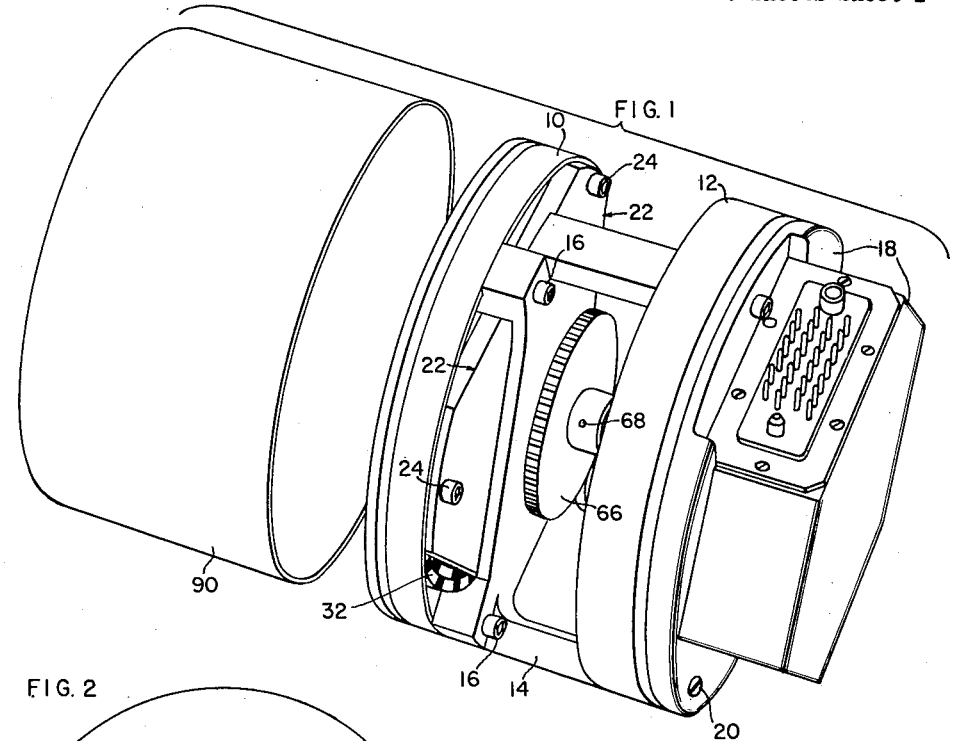
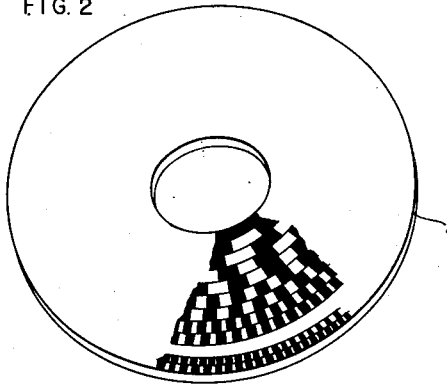
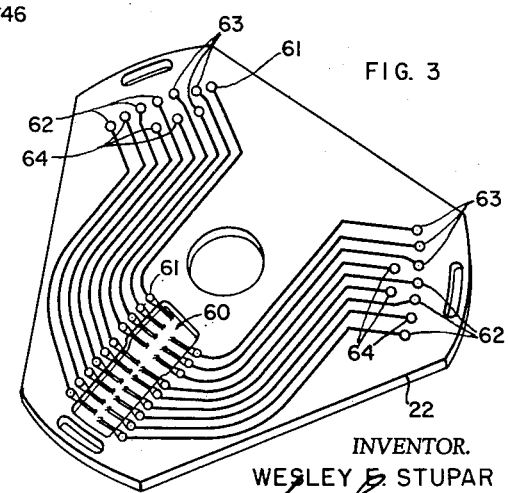
INVENTOR.
WESLEY E. STUPAR
BY
ATTORNEY Feb. 20, 1962  W. E. STUPAR  3,022,500
TRIGONOMETRIC CONVERTER
Filed Jan. 13, 1958  7 Sheets-Sheet 2

INVENTOR.
WESLEY E. STUPAR
BY
ATTORNEY

Feb. 20, 1962 W. E. STUPAR 3,022,500
TRIGONOMETRIC CONVERTER
Filed Jan. 13, 1958 7 Sheets-Sheet 3

INVENTOR.
WESLEY E. STUPAR
BY *Geo. Seewen*

ATTORNEY

Feb. 20, 1962     W. E. STUPAR     3,022,500
TRIGONOMETRIC CONVERTER

Filed Jan. 13, 1958     7 Sheets-Sheet 4

INVENTOR.
WESLEY E. STUPAR

BY

ATTORNEY

Feb. 20, 1962  W. E. STUPAR  3,022,500
TRIGONOMETRIC CONVERTER
Filed Jan. 13, 1958  7 Sheets-Sheet 5

INVENTOR.
WESLEY E. STUPAR
BY
ATTORNEY

Feb. 20, 1962  W. E. STUPAR  3,022,500
TRIGONOMETRIC CONVERTER
Filed Jan. 13, 1958  7 Sheets-Sheet 6

*INVENTOR.*
WESLEY E. STUPAR
BY
ATTORNEY

Feb. 20, 1962 W. E. STUPAR 3,022,500
TRIGONOMETRIC CONVERTER
Filed Jan. 13, 1958 7 Sheets-Sheet 7
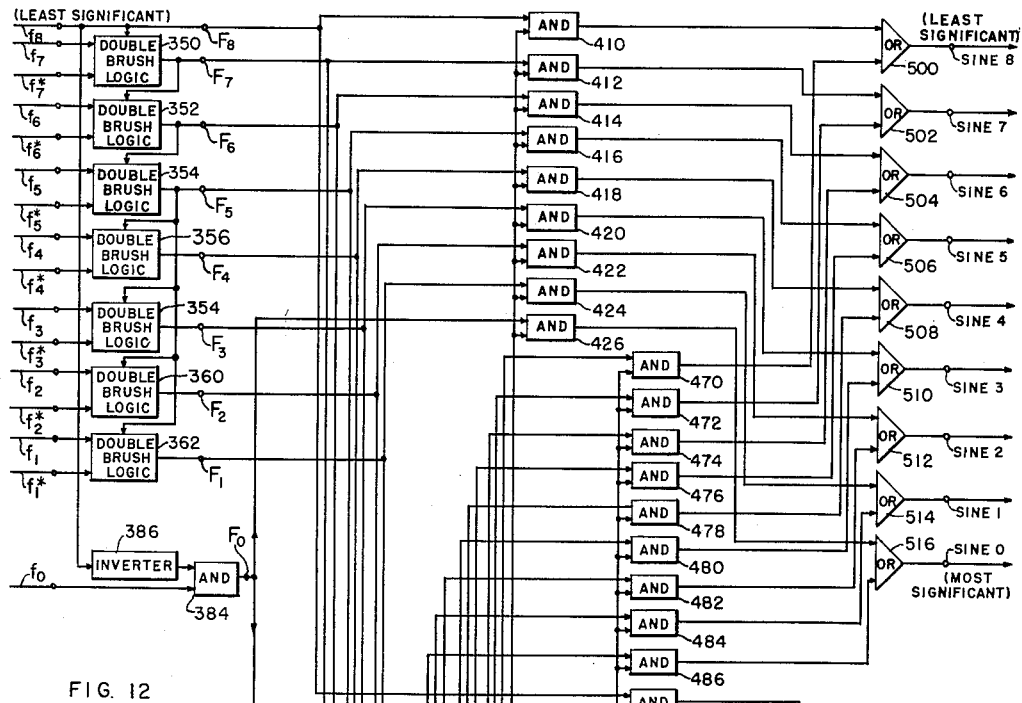
FIG. 12
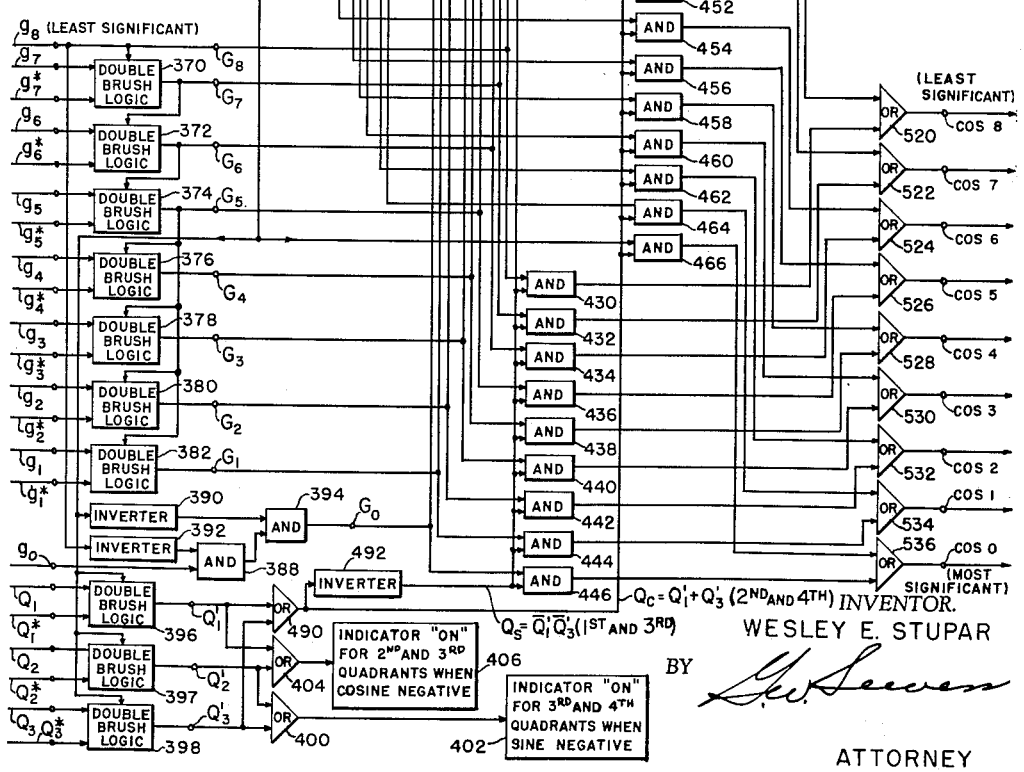
INVENTOR.
WESLEY E. STUPAR
BY
ATTORNEY

United States Patent Office 3,022,500
Patented Feb. 20, 1962

3,022,500
TRIGONOMETRIC CONVERTER
Wesley E. Stupar, Burbank, Calif., assignor to General Precision, Inc., a corporation of Delaware
Filed Jan. 13, 1958, Ser. No. 708,627
18 Claims. (Cl. 340—347)

The present invention relates to converters for transforming analogue quantities into signals representing binary digital numbers which correspond to such analogue quantities. More particularly, the invention is directed to an improved analogue-to-digital converter where the output digital signals bear a non-linear or trigonometric relation to the analogue quantities converted by the unit.

As a specific example, the invention provides an analogue-to-digital converter of the rotating information member type, and which converter is capable of transforming the analogue quantities represented by the angular position of a shaft coupled to the converter into digital signals representing the sine and the cosine of the angular position of the shaft, as referred to a particular reference position.

The increased use of highly accurate digital computers in recent years has created the need in many instances to convert analogue quantities into digital signals that may be utilized by such computers. For example, the analogue quantity represented by the angular position of a shaft, or by the position of any movable member, may be transformed into a group of binary signals respectively representing the digits of a multi-digital number, and which may be used by such computers. Units for transforming analogue quantities into such digital signals are commonly referred to in the art as analogue-to-digital converters.

An improved analogue-to-digital converter of the general type referred to above is disclosed and claimed in copending application, Serial Number 587,599, filed May 28, 1956 in the name of Wallace P. Chase. The converter described in the copending application includes a rotatable information member. A plurality of annular concentric tracks of different ordinal significance are positioned on a surface of the information member, and a plurality of digitally allocated conductive segments are positioned on the information member in respective ones of the tracks.

A plurality of electrically conductive contact brushes are provided in the assembly of the copending application, and these brushes contact the conductive segments in the different annular tracks as the information member rotates. The arrangement is such that the brushes develop digital output signals corresponding to the analogue quantities represented by the different angular positions of the information member.

The analogue-to-digital unit of the copending case uses a pair of brushes for each annular track of the information member. These brushes are controlled so that one brush only of each pair is energized at any particular time, and the energized brush is always the one which happens to be in positive contact with a conductive or nonconductive segment in its track at the time it is activated. This resolves any reading ambiguities that could otherwise arise because it assures that in no instance will a brush indicate a binary "zero" when it should be indicating a binary "1," and vice versa. Although these ambiguities are not too important for the lesser significant binary digits of the number represented, they are extremely important for the more significant digits of that number.

The present invention provides an analogue-to-digital converter of the same general type as the converter of the copending application. However, the digital output signals produced by the converter of the present invention, unlike the prior converters, bear a non-linear or trigonometric relation to the analogue quantities represented by these signals. For example, a first group of binary digital output signals may be provided by the converter of the invention having a sine function relation to the angular positions of a shaft coupled to the unit, and a second group of binary digital output signals may be produced having a cosine function relative to such angular positions. As is well known, digital signals bearing such sine and cosine relations to analogue quantities that are to be measured find widespread utility in many present day digital computers.

The sine-cosine analogue-to-digital converter of the embodiment of the invention which will be described utilizes the reading ambiguity resolving principles of the copending application 587,599 to achieve the desired conversions with a high degree of precision and with a maximum of economy and a minimum of space requirements.

In a specific embodiment of the invention a pair of disks is provided and one disk is coupled to the other through a usual 1:4 gear coupling arrangement. The first disk is coupled to the shaft or other member whose position is to be measured, this first disk is driven at a relatively low speed and will be termed the "low speed" disk or information member. The second disk described four revolutions for every revolution of the low speed disk. The second disk will be referred to as the "high speed" disk, or information member. The use of the techniques described in the copending case to resolve reading ambiguities permits the use of two disks, or information members, and it also permits a relatively simple and inexpensive coupling to be used between the disks without affecting the precision of the instrument.

The high speed disk or information member in the specific embodiment of the invention to be described has annular tracks and conductive segments thereon to represent one quadrant of the sine function and one quadrant of the cosine function. The low speed disk or information member, on the other hand, has segments positioned on it which serve to produce certain switching signals. These switching signals are used by control circuitry associated with the instrument to control the application of the digital output signals from the high speed information member to an output circuit.

As mentioned above, the arrangement is such that when the low speed information member is turned through 360 degrees, for example, to represent a full revolution of a shaft coupled to it, the high speed disk rotates through four full revolutions. The resulting digital output signals from the high speed information member are selectively applied to the output circuit and with a controlled polarity under the control of the switching signals from the low speed information member. This causes the signals from the high speed information member to be controlled so as to produce a full sine wave signal and a full cosine wave signal for each revolution of the low speed member.

The techniques described in the preceding paragraph permit relatively small size information members to provide high resolution sine-cosine function digital output signals. For a given size of information member, for example, the digital output signals have four times the resolution which they would have if produced directly.

In one embodiment of the invention, and as a further means for saving space, certain conductive segments representing the binary digits of higher significance are positioned on the low speed information member with the switching segments. The arrangement of the binary digit segments on the low speed member are repeated in each quadrant to permit a full reading of these segments for each revolution of the high speed information member.

To further increase the precision of the instrument of the invention, the contact brushes and the binary digit conductive segments in the information tracks of the disks are given a selected position relative to one another at the zero reference positions of the disks. This position is selected to shift the analogue zero position of the information members in a negative direction by a portion of an angular increment with respect to the digital output signals. This creates the situation in which each digit of the output digital signals rises to its next incremental value at the middle of an angular increment instead of at the end. Therefore, the digital output value is greater than the corresponding analogue quantity for the first half of each angular increment and is less for the second half. This halves the error which normally occurs when the digital output value is made to equal the corresponding analogue value at the beginning of each angular increment and then to be increasingly less for the remainder of the increment.

Certain full scale bit segments are positioned on one of the information members of the unit of the invention to provide a full scale reading at the end of each revolution of the low speed information member. This is to preclude the output from falling to zero at the end of the first half of the final angular increment of the information member due to the negative shift referred to above. This full scale bit segment in effect gives an (n+1) binary bit resolution in a system designed for an (n) bit resolution.

In the drawings:

FIGURE 1 is a perspective view of a constructed embodiment of the analogue-to-digital converter of the present invention, the cover being removed in this view to reveal the supporting frame of the unit, and also to reveal the manner in which the information disks are supported on the frame and to show the inter-coupling gear arrangement for the disks;

FIGURE 2 illustrates the high speed information member of the unit of FIGURE 1, this member being in the form of a rotatable disk having a plurality of annular concentric tracks arranged on one of its surfaces and with a plurality of digitally allocated electrically conductive segments being positioned on that surface in the various tracks;

Figure 4:
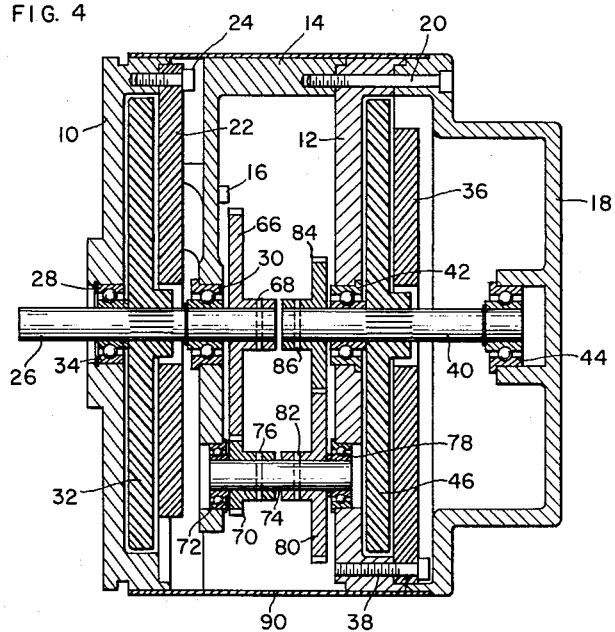
Figure 10:
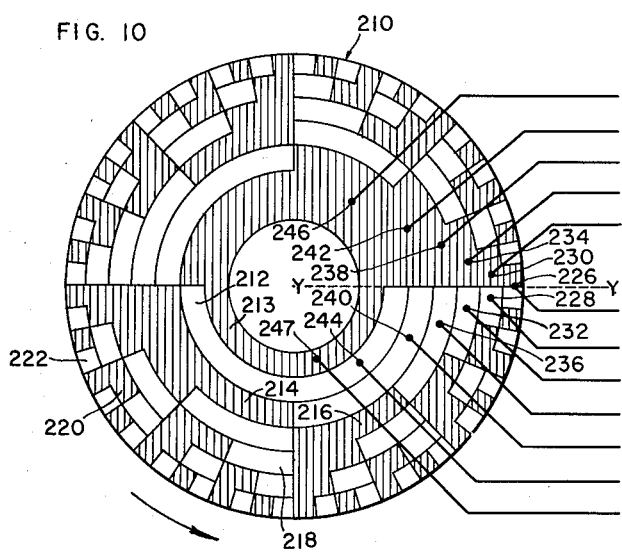
Figure 5:
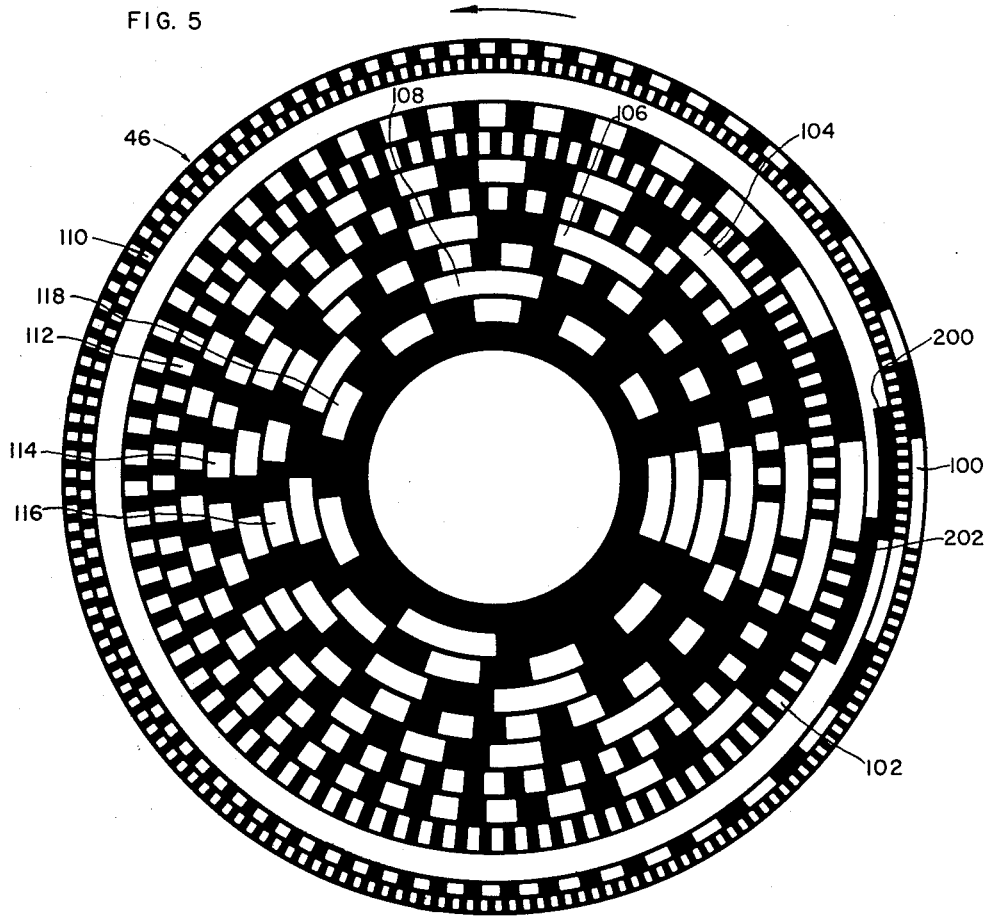
Figure 6:
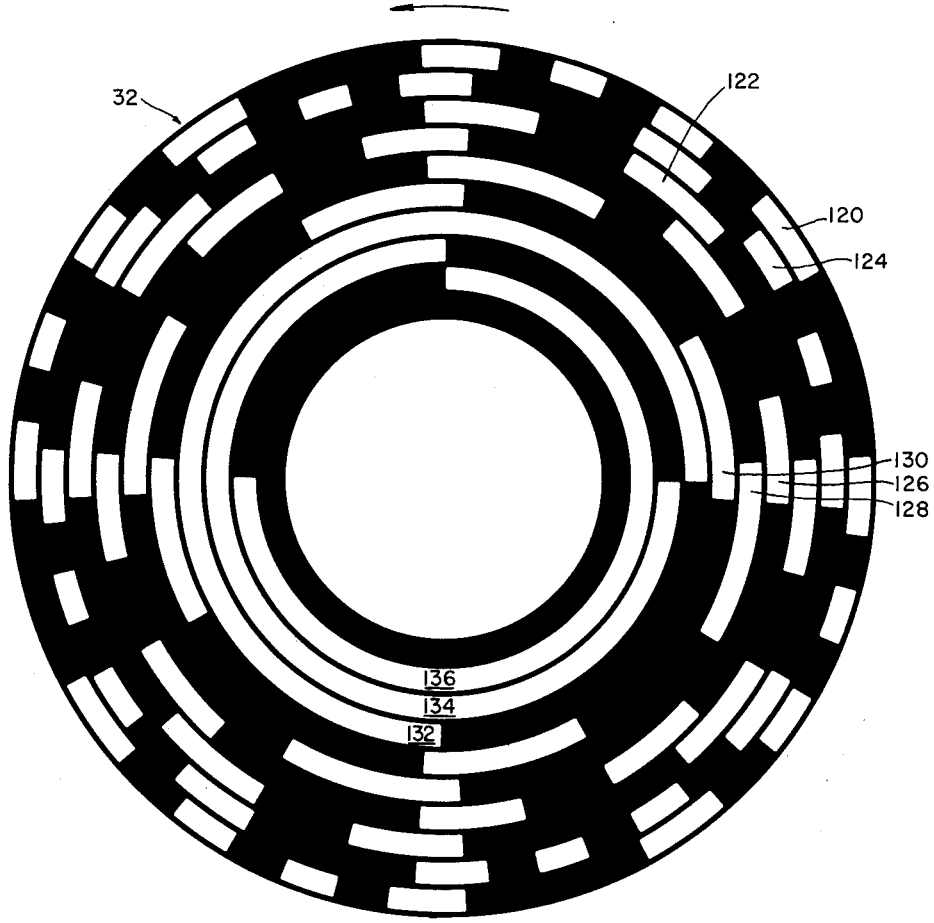
Figure 7:
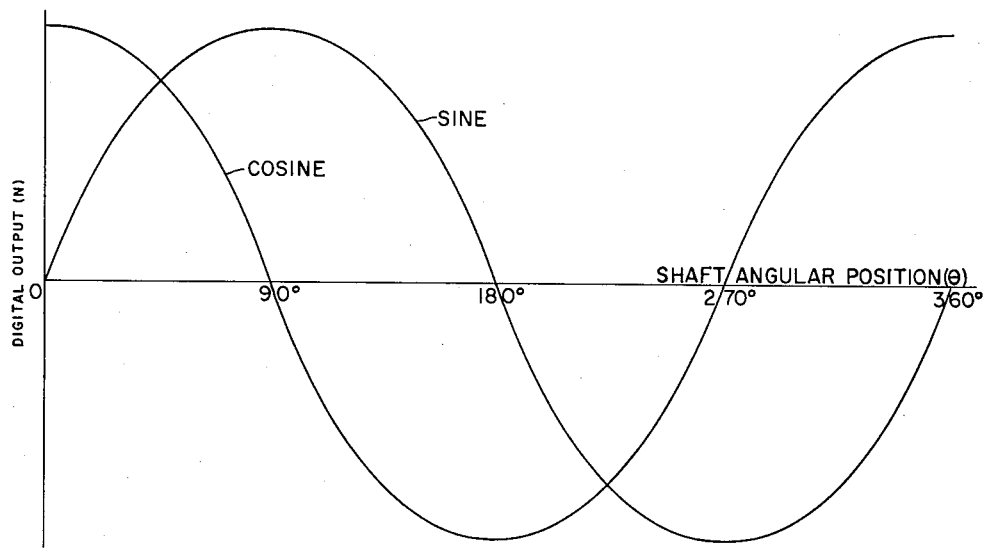
Figure 8:
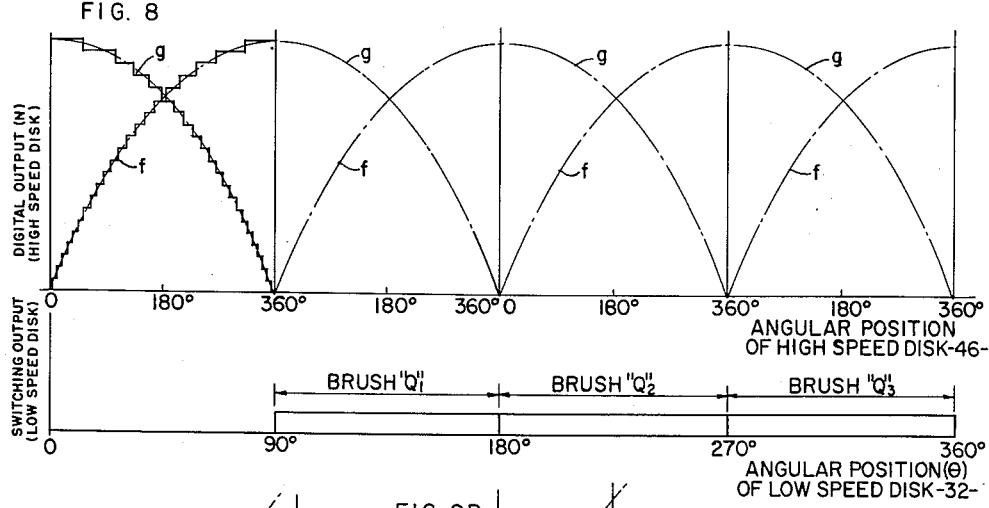
Figure 9A:
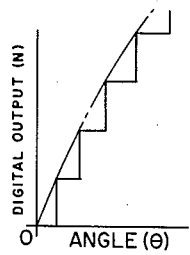
Figure 9B:
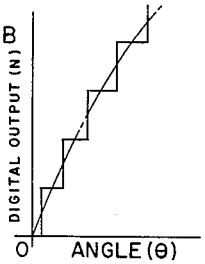
Figure 11A:
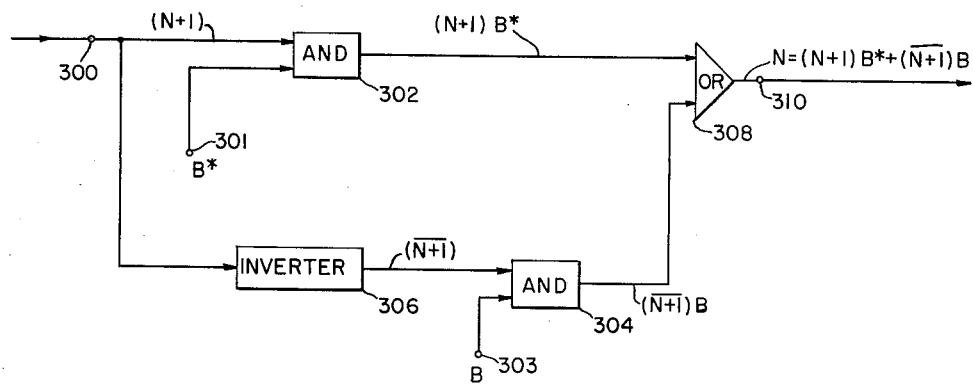
Figure 11B:
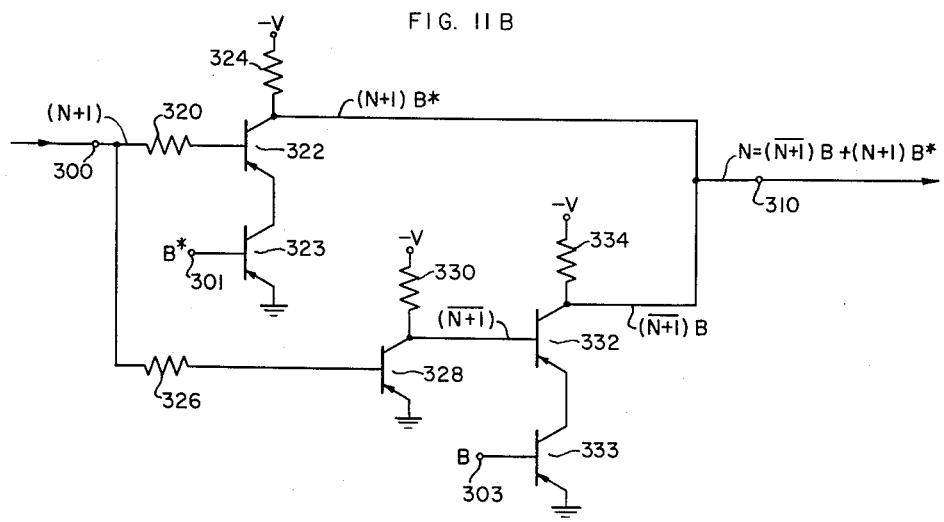

FIGURE 3 is a somewhat perspective showing of a brush block assembly which is supported in the frame of the instrument of FIGURE 1, this assembly being mounted so that a plurality of electrically conductive resilient contact brushes supported by the assembly engage the various tracks of the information members, the view of FIGURE 3 also showing the manner in which printed circuit techniques are used to connect the different brushes to two sets of electrical output terminals;

FIGURE 4 is a sectional view of the instrument of the present invention and this view clearly shows the manner in which two information members or disks are supported in the frame or housing of the unit in a rotatable manner, and how two brush block assemblies are supported in the frame adjacent respective ones of the information members, this view also showing a 1:4 ratio gear arrangement which is used to couple the low speed information member or disk to the high speed information member or disk so that rotation of the low speed information member through 90 degrees will cause the high speed information member to undergo a full revolution of 360 degrees;

FIGURE 5 is a detailed showing of the high speed information member or disk, this view showing in detail the concentric annular tracks on that member and the digital allocation of the electrically conductive segments in those tracks, the conductive segments being shown by the shaded areas in the various tracks;

FIGURE 6 is a detailed showing of the low speed information member included in the instrument of the invention, this member having several information tracks of higher significance than the tracks of the high speed information member in which the conductive segments are arranged in segments and the low speed information member also including certain switching tracks which include electrically conductive segments for controlling the signals from the brushes associated with the information tracks of the members;

FIGURE 7 shows a pair of curves illustrating the sine wave and cosine wave output signals that may be derived from the instrument of the invention as the low speed disk is rotated at a uniform speed through one complete revolution;

FIGURE 8 is a series of curves illustrating a pair of signals derived from the high speed information member of FIGURE 5 and from the information tracks of the low speed information member of FIGURE 6, these signals being repeated four times for each revolution of the low speed information member, and FIGURE 8 also shows the switching signals derived from the switching tracks of the low speed information member of FIGURE 6;

FIGURES 9A and 9B are fragmentary curves showing the decreased error effect that may be acieved by shifting the analogue zero point in a negative direction with respect to the digital output representations;

FIGURE 10 is a schematic representation of the prior art type of converter disclosed in the copending application 587,599 referred to above, this view being used to describe the manner in which the principles of the copending application are utilized to resolve reading ambiguities in the converter of the present invention;

FIGURES 11A and 11B are respectively block and circuit logic diagrams for carrying out certain switching functions consonant with the principles discussed in conjunction with FIGURE 10; and FIGURE 12 is a circuit diagram of a suitable control system for enabling the information members shown in FIGURES 5 and 6 to develop the sine and cosine output signals represented in FIGURE 7.

Referring now to FIGURES 1-4, the mechanical details of one embodiment of the present invention will now be described. The sine-cosine analogue-to-digital converter of the embodiment to be described includes a stationary-disk-like front frame member 10 which is composed of insulating material. The assembly also includes an intermediate disk-like frame member 12 which likewise is composed of insulating material.

A frame member 14 for the gear arrangement which inter-couples the two information members of the unit is interposed between the frame members 10 and 12. The gear frame member 14 also may be composed of insulating material and it is secured to the front frame member 10 by a series of screws, such as the screws 16. The unit also includes an end cap 18 preferably of insulating material having a dish-shaped configuration, and this end cap is secured to the intermediate frame 12 by means of a plurality of screws, such as the cap screw 20. Cap screws 20 also extend into the gear frame 14 and serve to hold the end cap 18, the intermediate frame 12 and the gear frame 14 in an assembled condition.

A brush block assembly 22 is supported on the front frame 10 by means of a plurality of cap screws such as the screw 24. The brush block assembly 22 is supported in coaxial relationship with the front frame 10 and is spaced from that frame. A shaft 26 extends through the front frame 10 and through the brush block assembly 22 and the gear frame 14. The shaft 26 is supported in the front frame 10 by means of a suitable bearing 28, and this shaft is supported in the gear frame 14 by means of a suitable bearing 30. A first information member 32 is mounted on the shaft 26 to be rotated by that shaft. The information member 32 is in the form of a disk and it constitutes the low speed information member of the instrument. The information member 32 is moved to different angular positions corresponding to the analogue quantities represented by the different angular positions of the driving shaft 26. A retainer ring 34 serves to hold the shaft 26 in position in the bearings 28 and 30.

A second brush block assembly 36 is mounted on the intermediate frame 12 by means of a plurality of cap screws, such as the screw 38. The brush block 36 is mounted in coaxial relationship with the intermediate frame 12 and is spaced from that frame.

A second shaft 40 extends through the intermediate frame 12 and through the brush block assembly 36. The shaft 40 is rotatably mounted at one end in a first bearing 42, which is supported by the intermediate frame 12 and the other end of the shaft is supported in a second bearing 44 which is mounted on the end cap 18.

The shaft 26 supports the rotatable low speed information member or disk 32 between the front frame 10 and the stationary brush block assembly 22. In like manner, the shaft 40 supports a rotatable information member or disk 46 between the intermediate frame 12 and the stationary brush block assembly 36. The shaft 40 is coupled to the shaft 26 through a 1:4 ratio gear arrangement which will be described in conjunction with FIGURE 4. This gear arrangement causes the driven shaft 40 to rotate 360 degrees for each 90 degree rotation of the driving shaft 26. The information member 46, like the information member 32, has a disk-like configuration, as noted above, and the information member 46 constitutes the high speed information member of the instrument.

The brush block assembly 22 is shown in more detail in FIGURE 3, and it is to be understood that the brush block assembly 36 may have a similar construction. As will be described more in detail later, the high speed information member 46 and low speed information members have a plurality of annular information tracks concentrically arranged on one surface, and conductive segments are positioned in the tracks to represent binary digits of different ordinal significance. The brush block assembly 22 supports a plurality of pairs of electrical contact brushes designated generally by the numeral 60. Each pair of brushes 60 is adapted to engage a different annular track on the low speed disk 32. The brush 61 is a "slipring" contact for the centermost segment of the disk. As will be described in detail subsequently, one series of annular tracks on the disk corresponds to what will be termed an "f" function, and a second series alternately spaced between the first series represents what will be termed a "g" function. The brushes cooperating with the annular tracks corresponding to the "f" function are respectively connected to a plurality of output terminals which are represented in FIGURE 3 collectively as 62. Likewise, the brushes engaging the annular tracks corresponding to the "g" function on the brush block assembly are connected to a plurality of output terminals which are represented collectively as 64 in FIGURE 3.

The contact brushes 60 supported on the brush block assembly 22 may be formed from a single resilient wire having a looped-over extremity which is adapted to engage and disengage the conductive segments of the annular track with which it is associated. Such brushes are described in some detail in the copending application, Serial Number 587,599, referred to above. Two such brushes are supported in offset relation for each of the annular tracks so that one brush leads the other brush insofar as the rotation of the information disks 32 and 46 are concerned. The two brushes of each pair are connected together, and the connection to their corresponding output terminal is made across the brush block assembly 22 by well known etched circuit techniques.

As shown in FIGURE 4, the shaft 26 has a pinion gear 66 mounted on its inner end by means, for example, of a pin 68. The gear 66 is in meshing relationship with a gear 70, the latter gear being mounted on a shaft 74. The shaft 74 is rotatably mounted in a bearing 72 which is supported by the front frame 10. The gear 70 is keyed to the shaft 74 by means, for example, of a pin 76. The other end of the shaft 74 is rotatably mounted in a bearing 78, which in turn is mounted on the intermediate frame 12. A gear 80 is mounted on the shaft 74, and this gear is keyed to the shaft by means of a pin 82. The gear 80 is in meshing engagement with a gear 84, and the latter gear is mounted on the shaft 40 by means, for example, of a pin 86.

The relative diameters of the gears 66, 70, 80 and 84 are made such that the shaft 40 is driven at four times the speed of the shaft 26. It should be noted that the shaft 40 is in axial alignment with the shaft 26 in the illustrated embodiment.

The unit is enclosed by a cylindrical cover 90. The high speed information member or disk 46 is shown in greater detail in FIGURE 5. This disk is assumed to be rotating in a counterclockwise direction with respect to the stationary brushes supported by the brush block assembly 36 similar to the assembly shown in FIGURE 3. In the illustration embodying my invention the brush block 36 is the same as block 22 except that it contains more brushes 60 to accommodate the greater number of tracks of the disk 46.

The high speed information disk 46 has a plurality of annular information tracks arranged in concentric relation on one of its surfaces. A first series of these annular information tracks alternately spaced annularly about the disk represent the five least significant digits of the "f" function, and a second series of these annular information tracks which are annularly alternately interspaced between the tracks of the first series represent the five least significant digits of the "g" function.

The least significant annular information track of the "f" function is represented at 100 at the rim of the disc 46. A plurality of electrically conductive segments are positioned on the disk 46 in track 100, these segments being represented by the shaded portions of the annular track 100. As shown in FIGURE 5, the angular length of the conductive segments and the spacing between the conductive segments in the annular track 100 varies around the track, the segments becoming longer and the spacing between them becoming greater progressively around the track in a clockwise direction.

This provides for the desired "f" function relation between the output signal derived from that track and the angular position of the disk. The second least significant information track of the "f" function is represented by the annular track 102. This latter information track also includes electrically conductive segments which have varying lengths and varying spacings progressively around the annular track. The segments in the annular tracks 100 and 102 are digitally allocated, as are the segments in all the information tracks. The purpose of the varying lengths and spacings, as noted above, is to provide a non-linear relation between the digital output signals and the analogue quantities represented by the angular positions of the disk 46.

The third least significant track of the "f" function is the information track 104, the fourth least significant track of the "f" function is the information track 106, and the fifth least significant track of this function is the information track 108. As noted, each of the information tracks 100, 102, 104, 106 and 108 includes electrically conductive segments which are digitally allocated in increasing ordinal significance from track to track, and which segments have varying lengths and varying spacings to provide the desired "f" function relation between a first group of digital output signals and the analogue quantities represented by these signals.

In like manner, the five least significant digtis of the "g" function are represented respectively by the information tracks 110, 112, 114, 116 and 118. These latter tracks also include digitally allocated electrical conductive segments. As in the "f" function tracks, the lengths and spacings of the segments in each "g" function information track vary around the track. It will be noted that the conductive segments of the "f" function information tracks (tracks 100, 102, 104, 106 and 108) increase in length progressively in a clockwise direction around the tracks, whereas the conductive segments in the "g" function (tracks 110, 112, 114, 116 and 118) information tracks decrease in length and spacing progressively in the clockwise direction around the annular tracks.

The three most significant digits of the digital output signals for both the "f" function and the "g" function are carried by the low speed information disk 32 of FIGURE 6 in quadrants on that disk. This is a matter of convenience because of the available space on the low speed disk, and because the relative large size and spacing of the conductive segments corresponding to the more significant digits enables the quadrants to be conveniently positioned on that disk. For example, the information disk 32 includes an outer annular information track 120, and this track includes electrically conductive segments which are digitally arranged to represent the sixth ordinal significant level of the "f" function. Because the low speed disk 32 is rotating at one-quarter the speed of the high speed disk 46, the conductive segments in the annular track 120, and in the other information tracks on the low speed disk are repeated in each quadrant on the low speed disk.

The low speed disk 32 of FIGURE 6 also includes an annular information track 122 corresponding to the seventh level of ordinal significance of the "f" function, and it includes an annular information track 124 corresponding to the sixth level of ordinal significance of the "g" function and an annular information track 126 corresponding to the seventh level of ordinal significance of the "g" function. The information disk 32 also has an annular information track 128 corresponding to the eighth ordinal level of the "f" function, and an information track 130 corresponding to the eighth ordinal level of the "g" function.

In each instance, the conductive segments are digitally allocated in the information tracks on the low speed information disk 32, properly to provide the digital outputs corresponding to the three most significant levels of the "f" and "g" functions. Also, the conductive segments in each of these latter annular tracks, like the conductive segments in the tracks on the high speed information disk 46, have varying angular lengths and varying spacings in each quadrant, so that the digital output signals will provide the desired sine and cosine ("f" and "g" function) relation to the analogue quantities converted by the instrument.

The brushes 60 on the brush block assembly 22, and corresponding brushes on the brush block assembly 36, engage and disengage the different conductive segments on the information tracks of the high speed disk and of the low speed disk as these disks rotate. These brushes produce a first group of digital output signals at the output terminals 62 (and at other output terminals on the brush block 22) corresponding to the curve "f" of FIGURE 8, and they provide a second group of digital output signals at the output terminals 64 (and at other terminals on the brush block 22) corresponding to the curve "g" of FIGURE 8. It will be seen that the curves "f" and "g" in FIGURE 8 are repeated each time the high speed disk rotates, so that the repetition is four times for one revolution of the low speed disk and of the shaft 26 whose angular analogue position is to be transformed into the digital output signals.

The low speed information disk 32 of FIGURE 6 also includes three annular concentric switching tracks 132, 134 and 136. These tracks each have a conductive segment extending through a different quadrant. A plurality of switching brushes designated generally at 63 and severally as $Q_1$, $Q_2$ and $Q_3$ supported on the brush block assembly 22, respectively engage these segments in the switching tracks and they cooperate to produce the switching signals represented by the lower graph of FIGURE 8. For a first quadrant of revolution of the low speed disk 32, none of the switching brushes 63 engages a conductive segment; for the second quadrant the switching brush "$Q_1$" engages a conductive segment in its track 132; for the third quadrant the switching brush "$Q_2$" engages the conductive segment in its track 134; and for the fourth quadrant the switching brush "$Q_3$" engages the conductive segment in its track 136.

This engagement of the brushes $Q_1$, $Q_2$ and $Q_3$ enables switching signals to be derived indicative of the particular quadrant in which the low speed disk of FIGURE 6 is in at any particular time. These switching signals, in a manner to be described, are used to control the selective application of the "f" function and "g" function groups of digital signals, corresponding respectively to the upper curves of FIGURE 8, to a first group of output terminals and to control the polarity of the signals so applied. This provides for the production of digital signals corresponding to the sine wave curve of FIGURE 7 at the first group of output terminals. These switching signals also serve to control the application, and polarity of the application, of the "f" function and "g" function digital output signals to a second group of output terminals to obtain digital output signals at the second group of output terminals corresponding to the cosine function shown by the cosine curve of FIGURE 7.

For example, and in a manner to be described, for the sine function, the switching signals cause the "f" function digital signals corresponding to the curve "f" of FIGURE 8 to be applied to the first group of output terminals with positive polarity for the first quadrant of revolution of the low speed disk 32; they cause the "g" function digital signals corresponding to the curve "g" of FIGURE 8 to be applied with positive polarity to those output terminals for the second quadrant of revolution of the low-speed disk 32; they cause the "f" function digital signals corresponding to the curve "f" to be applied to those output terminals with negative polarity for the third quadrant of revolution of the low speed disk 32; and they cause the "g" function digital signals corresponding to the curve "g" to be applied to those output terminals with negative polarity for the fourth quadrant of revolution of the low speed disk 32.

In like manner, for the cosine function, the switching signals cause the "g" function digital signals corresponding to the curve "g" of FIGURE 8 to be applied with positive polarity to the second group of output terminals for the first quadrant of revolution of the low speed information disk 32; they cause the "f" function digital signals corresponding to the curve "f" of FIGURE 8 to be applied to the second group of output terminals with negative polarity for the second quadrant of revolution of the low speed disk; they cause the "g" function digital signals corresponding to the curve "g" to be applied to the second group of output terminals with negative polarity for the third quadrant of revolution of the low speed disk; and they cause the "f" function digital signals corresponding to the curve "f" to be applied to the second group of output terminals with positive polarity for the fourth quadrant of revolution of the low speed disk.

An examination of FIGURE 9A will reveal that when the analogue zero position of the information members is made equal to the zero digital value, the digital value remains at zero for the entire first angular increment; then the digital signal rises abruptly to a level corresponding to the first digit. Then, after a second angular increment the digital signal rises abruptly to the second level, corresponding to the second digit, and so on. The actual curve to be represented, therefore, is represented by the peak values of the transitions from one digital level to another. This produces an error of an entire digital step at the end of each angular increment. This error can be reduced in half by shifting the analogue zero position of the information member in a negative direction by one half an angular increment with respect to the digital output signals. Specifically, and as shown in FIGURE 9B, the analogue zero may be shifted in a negative direction an amount corresponding to one-half an increment of the angle θ. This, of course, can be easily achieved by shifting the position of the brushes associated with the information disks so that when the low speed disk 32 rotates through one-half an increment from a reference zero position the digital output rises to a level corresponding to the first binary digit.

However, when the zero analogue position is shifted in the negative direction, as described above, the digital output of the converter would normally fall to zero as the low speed information member approaches the end of each revolution, and when the remaining interval to complete a revolution corresponds to one-half an angular increment, this being due to the negative shift of the zero output value. To obviate this condition, in effect a ninth full scale bit is added as an electrically conductive segment 200 on the high speed disk 46 in an annular track adjacent the least significant track of the cosine function, and an electrically conductive segment 202 is positioned on the high speed information disk 46 in an annular track adjacent the annular track of the segment 200.

The conductive segment 200 is positioned to terminate at the zero analogue point, and the leading edge of this segment overlaps the last conductive segment of the least significant information track 100 of the sine function. External control circuitry controls the activation of the segment 200 so that the brush engaging that segment is energized precisely at the moment the brush engaging the last segment of the least significant sine function track is deenergized. Therefore, a signal is produced at a further output terminal during an interval when the digital output would normally fall to zero. At this time, all the other digital output signals are zero and a ninth full scale bit 1.00000000 is thereby achieved.

The segment 202 controls the cosine function, and this segment overlaps the segment 200. However, the brush engaging the segment 202 is positioned so as to be activated only upon the disengagement of the corresponding brush with the segment 200. Therefore, at a time when the cosine function would normally erroneously be zero, the full scale segment 202 enables a ninth bit value to be achieved. This condition persists until the cosine brushes contact the conductive segments in the other tracks to count down one to the value 0.11111111.

Therefore, the inclusion of the segments 200 and 202 on the high speed disk 46 permits a closer approximation to be made between the digital output signals and the true sine wave and cosine wave curve. As shown in FIGURE 9B, the actual true corresponding curve extends through the centers of the digital increments when the negative shift described above is made, so that the errors are cut by one-half. Then, when the full revolution of the high speed disk is approached, a binary count of 1.00000000 is achieved in the sine function, and when analogue zero is reached, a binary count of 1.00000000 is reached in the cosine function.

The present invention permits a full sine wave and cosine wave function to be derived with a high degree of precision and in a relatively small space. This is achieved by the provision of two separate disks, with the high speed disk merely providing a quadrant of each function, and with the low speed disk performing switching operations so that the entire sine and cosine waves can be derived for each revolution of the low speed information disk. Also, and for reasons of convenience, some of the more significant information tracks which would normally be included on the high speed disk are quadrantially placed on the low speed disk.

One of the reasons that the objectives of the present invention can be achieved and a precision reading be obtained from two disks that are intercoupled through a gear drive, is the application of the teachings of the copending application 587,599 which was filed May 28, 1956 in the name of Wallace P. Chase. The teaching of this application permits precise readings without unduly close tolerances.

As noted briefly above, a pair of brushes displaced from one another is provided in each information track on the information members, and these brushes are controlled so that the activated brush at any time is well within the confines of a conductive or non-conductive segment which is to be read. This means that even though certain mechanical tolerances are not maintained to severely close limits, this does not affect the electrical precision of the instrument.

The manner in which the brushes are controlled to resolve any reading ambiguities will now be described in conjunction with FIGURE 10. The information disk of FIGURE 10 is a linear conversion type of disk similar to that described in the copending application 587,599. The description is applied to such a disk for purposes of simplicity. However, it will be appreciated as the description proceeds, that the same principles may be applied to the non-linear conversion type of information disks of FIGURES 5 and 6 to control similar pairs of brushes which engage the various information tracks on those disks.

The information member illustrated by FIGURE 10 is in the form of a rotatable disk 210 which is adapted to be mounted on the end of a shaft. The disk 210 is so mounted in coaxial relation with the shaft, to be rotatable with it about a common axis. The disk 210 assists in the production of digital signals representative of the angular position of the shaft at any particular instant. These signals, unlike the information members of the present invention, are linearly related to shaft rotation, instead of in a sine or cosine function. The disk 210, like the disks 32 and 46 described above, may be made from a suitable insulating material, and the disk 210 is provided with a plurality of electrically conductive arcuate segments formed on at least one of its surfaces.

The conductive segments on the information disk 210 are positioned in each of a series of annular concentric tracks 212, 214, 216, 218, 220 and 222. In FIGURE 10, the conductive segments are shown as the shaded areas on the disk. The conductive and non-conductive segments are digitally allocated in the various tracks, with each track having a different ordinal significance increasing from the rim of the disk toward the center. That is, from the track 222 to the track 212. It will be observed, that the arrangement of the conductive segments on the disk 210 is similar to the arrangement of, for example, the sine function segments on the disk 46, with the exception that the latter segments are of a varying length and a varying spacing around each track on the disk 46 to provide the desired sinusoidal output signals.

The track 212 has a conductive segment extending through an arc of substantially 180 degrees, and it has non-conductive segment extending through the other 180 degrees. The track 214 has two conductive segments and two non-conductive segments all of equal length, with each segment extending through an arc of 90 degrees and with each conductive segment being separated by a non-conductive segment. The leading edge of one of the non-conductive segments in the track 214 may be aligned with the leading edge of the non-conductive segment of the track 212, assuming counterclockwise rotation of the disk 210.

The track 216 has four conductive segments and four non-conductive segments, each having an angular length of approximately 45 degrees. The conductive and non-conductive segments of the track 216 are interspaced, as shown. The leading edge of one of the non-conductive segments of the track 216 may be aligned with the leading edge of the non-conductive segment of the track 212. The track 218 has sixteen alternately positioned conductive and non-conductive segments, and each segment has an angular length of approximately 22½ degrees. The leading edge of a non-conductive segment in the track 218 is aligned with the leading edge of the non-conductive segment of the track 212.

Likewise, the track 220 has thirty-two conductive and non-conductive segments of equal angular length, and the track 222 has sixty-four conductive and non-conductive segments of equal lengths. The leading edge of a non-conductive segment in the track 220 and the leading edge of a non-conductive segment in the track 222 are aligned with the leading edge of the non-conductive segment in the track 212.

These aligned leading edges of non-conductive segments in each the tracks 212, 214, 216, 218, 220 and 222 may be considered as the zero position of the information disk 210, this zero analogue position being indicated by the line Y—Y. The information disk 210 also has a central track 213 which is concentric with the other tracks and which is entirely conductive. The track 213 serves as a convenient connecting means to the information disk. The disks 46 and 32 have similar fully conductive tracks at the innermost position of each disk.

As represented by the aligned leading edges of the respective non-conductive segments in the tracks 212, 214, 216, 218, 220 and 222 as described above, the zero position of the disk 210 extends along the line Y—Y of FIGURE 10. If a plurality of stationary conductive brushes are disposed along the line Y—Y in respective engagement with the different tracks 212, 214, 216, 218, 220 and 222 on the disk 210, then the conductive segments will make contact with these brushes in a sequence to set up a usual binary count at respective output terminals connected to the brushes. For this count, the track 222 produces signals corresponding to the least significant binary digit, and the significance of the digits increase toward the track 212, the latter track representing the most significant binary digit. That is, the tracks 212, 214, 216, 218, 220 and 222 are arranged in decreasing ordinal significance from the center of the disk 210; the row 222 representing the digit $2^0$, the row 220 representing the digit $2^1$, the row 218 representing the digit $2^2$, and so on. It is clear, therefore, that the brushes positioned along the line Y—Y will generate a series of pulses corresponding to a multi-digital binary number which represents the analogue quantity corresponding to the angular position of the shaft at any instant.

False indications may occur, however, when a single set of brushes is disposed along the line Y—Y. Such a false indication may occur, for example, when a brush is intended to contact and read a conductive segment in any particular track and, in passing the dividing line between that conductive segment and the adjacent non-conductive segment in the track, the brush fails to read the conductive segment. This is not particularly serious in the least significant track 222. However, a material error can arise from such a reading ambiguity in, for example, the most significant track 212. To prevent the possibility of such reading ambiguities, a paired set of brushes is used in each track except in the least significant track 222.

In the arrangement illustrated in FIGURE 10, a single brush 226 is associated with the least significant track 222, and two brushes are associated with each of the succeeding tracks 222, 220, 218, 216, 214 and 212. A brush 228 and a brush 230 are associated with the track 220. The brush 228 leads the brush 226 for a counterclockwise direction of rotation of the disk 210 and the brush 230 lags the brush 226 for this direction of rotation. A brush 232 and a brush 234 are associated with the track 218. The brush 232 leads the brush 228 for counterclockwise rotation of the disk 210 and the brush 234 lags the brush 230.

In like manner, brushes 236 and 238, brushes 240 and 242 and brushes 244 and 246 are respectively disposed in contiguous relationship to the tracks 216, 214 and 212. The brushes 236, 240 and 244 lead the corresponding brushes in the preceding track and the brushes 238, 242 and 246 lag the corresponding brushes in the preceding track in a manner similar to that described above. Finally, a brush 247 is associated with the conductive track 213.

Now, again assuming that the disk 210 is in its zero position in FIGURE 10, the aligned leading edges of the non-conductive segments of the tracks 212, 214, 216, 218, 220 and 222 will extend along the line Y—Y. For this zero position, the brush 226 is on the leading edge of a non-conductive segment in the row 222; the brushes 228, 232, 236, 240 and 244 contact the disk at positions on one side of the line Y—Y; and the brushes 230, 234, 238, 242 and 246 contact the disk 210 at positions on the other side of the line Y—Y in symmetrical relation with the positions of their paired brushes 228, 232, 236, 240 and 244.

As indicated above, the brushes 228, 232, 236, 240 and 244 are the leading brushes as the information disk 210 rotates in a counterclockwise direction, and the brushes 230, 234, 238, 242 and 246 are the lagging brushes. Each of the brushes 228, 232, 236, 240 and 244 lead the brush 226 by an angular distance substantially equal to one-quarter of the length of each of the conductive and non-conductive segments in the corresponding track. Likewise, each of the brushes 230, 234, 238, 242 and 246 lags the brush 226 by an angular distance substantially equal to one-quarter of the length of the conductive and non-conductive segments in its associated track.

As the disk 210 rotates in a counterclockwise direction, the conductive and non-conductive segments in each of the tracks assume different relationships with the brushes. In the manner described above, the angular rotation is indicated on a digital basis by the positioning of the brushes relative to the conductive and non-conductive segments in their associated tracks. Since the conductive and non-conductive segments in the track 222 are shorter than the conductive and non-conductive segments in any other track, the track 222 indicates the binary digit of least significance, as noted above. That is, the track 222 indicates the value of $2^0$. By the same token, the track 220 indicates the value of $2^1$, the track 218 indicated the value of $2^2$, and so on.

The value of the binary digit represented by the track 222 at any instant is read by the brush 226 since this is the only brush associated with that track. However, the value of the digit represented by the track 220 is read by the selected one of the two brushes 228 and 230. Similarly, the value of the digit represented by the track 218 is read by the selected one of the brushes 232 and 234, and the value of the digit represented by the track 216 is read by the selected one of the brushes 236 and 238. In like manner, the value of the digit represented by each of the other tracks is indicated by the selected one of the brushes in that track. To preclude false readings, the brush selected in each of the tracks 212, 214, 216, 218 and 220 must be within the confines of a conductive or non-conductive segment in its corresponding track at the time it is read, and it must not be crossing the border between any such segments. Such a selection will assure that there will be no possibility of a brush reading "0" (or a non-conductive segment) when it should be reading "1" (or a conductive segment), or vice versa. In short, this will assure that there will be no possibility of false or ambiguous indication from any brush except the least significant brush 226. As noted previously, false readings from the brush 226 can be tolerated since it represents the least significant binary digit.

The physical relation between the various brushes may be seen from a particular example, such as the brushes associated with the tracks 222 and 220. When the brush 226 becomes positioned in contiguous relationship to a particular conductive portion of the track 222, the lagging brush 230 has already become positioned in contacting relationship to a particular conductive or non-conductive segment in the row 220. The lagging brush 230 continues to contact the particular segment in the row 220 for at least as long a time as the brush 230 contacts the particular conductive portion in the track 222. Therefore, the lagging brush 230 in the track 220 should be selected when the brush 226 engages a conductive segment rather than the leading brush 228. This will assure a true indication from the track 220.

On the other hand, when the brush 226 starts to contact a non-conductive segment in the track 222, the leading brush 228 is already contacting the particular conductive or non-conductive segment of the track that is to be read for a true indication of the analogue quantity at that instant. Moreover, the leading brush 228 remains in that segment until after the brush 226 starts to contact the next conductive portion of the track 222. Therefore, the leading brush 228 should be selected whenever the brush 226 engages a non-conductive segment so as to obtain a true indication of the digit represented in the track 220.

Similarly, whenever the selected brush in each track starts to contact a conductive segment, the lagging brush in the track of the next higher significance has already started to contact the particular conductive or non-conductive segment that is to be read for an indication for the analogue quantity at that instant. Moreover, the lagging brush in each track will continue to contact the particular segment in the track until the conductive segment in the preceding track has moved past the brush selected in that track. Therefore, the lagging brush in the next succeeding track should always be selected for reading whenever the selected brush in a particular track engages a conductive segment.

On the other hand, whenever the selected brush in any track is in engagement with a non-conductive segment, the leading brush in the next succeeding track should be selected for reading because it has already started to contact the conductive or non-conductive segment that is to be read for an indication at that instant. The leading brush will continue to engage that segment until the selected brush of the preceding track has started to engage the next conductive segment in the preceding track.

The same principles are applied to the brushes associated with the various information tracks on the information disks 32 and 46 in the system of the present invention. It should be reiterated, that it is through this ambiguity resolving control of the brushes that the apparatus of the present invention provides the desired digital output with a high degree of precision by the use of a pair of information disks mechanically coupled to one another.

In the double brush system of FIGURE 10 described above, the angular distance between the single brush 226 of the least significant track 222 and each of the double brushes 228 and 230 of the second least significant track 220 equals one-half the angular length of each segment in the least significant track. This is the optimum spacing that can be tolerated without effecting the electrical precision of the instrument. In like manner, the optimum spacing between the leading brush 228 of the second least significant track and the leading brush 232 of the third least significant track, and between the lagging brushes 230 and 234 in these tracks, also is one-half the angular length of each segment in the least significant track 222. This optimum spacing between the brushes also applies to the leading and lagging brushes of each succeeding one of the information tracks 218, 216, 214 and 212.

For proper switching between the double brushes in any track and the controlling brush in the track of next lesser significance, the following logical equation must be fulfilled:

$$N = B\overline{(N+1)} + B^*(N+1)$$

Where:

B is the brush in any track which is displaced from the index line in the direction of increasing binary number.

B* is the brush in the same track which is displaced from the index line in the direction of decreasing binary number.

N is the controlled bit in any track.

N+1 is the controlling bit from the track of next lesser significance.

That is, the brush "B" in any information track is selected when the controlling bit in the track of the next lesser significance is "0" corresponding to the brush engagement with a non-conductive segment in the latter track, and the brush "B*" is selected when the controlling bit in the next least significant track is "1" corresponding to the brush engagement with a conductive segment in that track.

In the converter of FIGURE 10, "B" is the leading brush and "B*" is the lagging brush. More generally, however, and in the converter of the present invention, the brush "B" (as noted above) is the brush displaced from the index line in the direction of increasing binary number (the lead brush for the "f" function and the lagging brush for the "g" function); and the brush "B*" is the brush displaced from the index in the direction of decreasing binary number (the lagging brush is the "f" function and the leading brush for the "g" function).

From the above logical equation and from the preceding discussion, it should be appreciated that when one of the double brushes in any track is making a transition from a conductive to a non-conductive segment, or vice versa, the other brush is always read. This eliminates the transition point and precludes any possibility of a binary "0" reading for a binary "1," and vice versa. When such a double-brush arrangement is used, and as noted above, either of the double brushes in any track can be misaligned up to one-half the angular length of the segments in the least significant track without affecting the precision of the apparatus.

A suitable control circuit for selecting the proper brush in any information track under the control of the activated brush in the preceding track is fully described in copending application Serial Number 587,599. A similar control system and circuit is shown in the logic block diagram of FIGURE 11A and in the corresponding logic circuit diagram of FIGURE 11B. This logic system can be used in conjunction with any particular information track, and it will be referred to subsequently in conjunction with FIGURE 12 as a "double brush logic" block.

The logic systems of FIGURES 11A and 11B respond to a control signal from the activated brush in the next preceding track of lesser significance to complete a connection from the "B*" brush in a particular track to an output terminal when the selected brush in the preceding track contacts a conductive segment, and the circuitry serves to complete a connection from the "B" brush in the particular track to the output terminal when the selected brush in the preceding track engages a non-conductive segment. This provides an output signal answering the requirements of the logic equation:

$$N = \overline{(N+1)}B + (N+1)B^*$$

The logic system of FIGURES 11A and 11B includes an input terminal 300 which is adapted to be connected to the output terminal of the corresponding control circuit associated with the preceding track. This enables the selected brush of the preceding track to provide a binary signal corresponding to the controlling bit (N+1). This signal has a negative value (N+1) when a conductive segment is engaged by that brush, and it has a zero value $\overline{(N+1)}$ when a non-conductive segment is engaged.

The input terminal 300 of the system of FIGURE 11A is connected to an input terminal of an "and" network 302 and to the input terminal of an inverter network 306. The inverter network 306 is connected to an input terminal of an "and" network 304. The logic system of FIGURES 11A and 11B also includes an input terminal 301 which is connected to the "B*" brush in the information track under consideration. This input terminal is further connected to a second input terminal of the "and" network 302. The logic system of FIGURE 11A also includes a further input terminal 303 which is connected to the "B" brush of the information track under consideration. The input terminal 303 is further connected to a second input terminal of the "and" network 304.

Appropriate circuitry for the "and" networks 302 and 304 will be described in conjunction with FIGURE 11B. These networks in themselves are well known to the art, and they serve to translate a signal to an output terminal in response to the simultaneous application of a plurality of input signals to respective input terminals. Only when all the input signals are present in an "on" state is the "and" network conditioned for conduction. The "on" state of the signal in the present system will be considered as the negative value.

The inverter network 306 may be any type of phase inverter, and an appropriate circuit for the inverter will be described in conjunction with FIGURE 11B. The purpose of the inverter network 306 is to introduce a one signal to the "and" network 304 when the controlling brush of the preceding track engages a non-conductive segment and a zero signal when the controlling brush engages a conductive segment. In this manner, the signal $(N+1)$ is applied to the "and" network 302 to condition that network for conduction when the activated controlling brush in the preceding track engages conductive segment; whereas, the inverter network 306 introduces the signal $\overline{(N+1)}$ to the "and" network 304 to condition the latter "and" network for conduction when the controlling brush engages a non-conductive segment.

In this manner, the "B*" brush in the track under consideration is selected by the "and" network 302 when the controlling brush in the preceding track engages a conductive segment, and the "B" brush is selected by the "and" network 304 when the controlling brush engages a non-conductive segment. The "and" network 302, therefore, develops an output signal $(N+1)B^*$, and the "and" network 304 develops an output signal $\overline{(N+1)}B$.

The "and" network 302 is connected to the input terminal of an "or" network 308, and the "and" network 304 is connected to a second input terminal of this "or" network. The "or" network is extremely well known to the computer and data processing art. This network serves to isolate circuits connected to its respective input terminals and to pass a signal to its output terminal in response to the application of a signal in an "on" state to any of its input terminals. The present "or" network 308 is connected to an output terminal 310.

Therefore, the signal N appearing at the output terminal 310 is derived from the brush "B*" when the controlling brush in the preceding track engages a conductive segment, and this signal N is derived from the brush "B" when the controlling brush in the preceding track engages a non-conductive segment. This, for the described reasons, is the desired control to assure that under no circumstances will the selected brush be making a segment transition at the time of selection.

The output signal N at the terminal 310 can, therefore, be expressed logically as:

$$N=(N+1)B^*+\overline{(N+1)}B$$

In the circuit diagram of FIGURE 11B, the input terminal 300 is connected to one terminal of a resistor 320, and the other terminal of this resistor is connected to the base of a transistor 322. This transistor, and the ones to be described subsequently, may be the usual PNP type of transistor. The input terminal 301 is connected to the base of a transistor 323. The emitter of the transistor 323 is grounded, and its collector is connected to the emitter of the transistor 322. A resistor 324 is connected to the collector of the transistor 322 and to the negative terminal of an appropriate direct voltage source designated "—V." The collector of the transistor 322 is also connected to the output terminal 310.

The input terminal 300 is also connected to a resistor 326, which, in turn, is connected to the base of a transistor 328. The emitter of the transistor 328 is grounded, and its collector is connected to a resistor 330. The latter resistor, in turn, is connected to the negative terminal of the direct voltage source "—V."

The collector of the transistor 328 is also connected to the base of a transistor 332. The input terminal 303 is connected to the base of a transistor 333, the emitter of that transistor being grounded. The collector of the transistor 333 is connected to the emitter of the transistor 332. The collector of the transistor 332 is connected to a resistor 334, which, in turn, is connected to the negative terminal of the direct voltage source "—V." The collector of the transistor 332 is also connected to the output terminal 310.

The transistor circuitry described above is the equivalent to the blocks illustrated in FIGURE 11A, and because the circuitry is relatively straightforward, it is believed that a more detailed description of its parameters, its circuit constants, or of its various components is unnecessary.

The circuitry of the transistors 322 and 323 constitute the "and" network 302. Only upon the introduction of the $(N+1)$ signal in its negative state to the transistor 322 is that transistor rendered conductive to the signals from the "B*" brush which are introduced to the input terminal 301. The circuitry of the transistor 328 constitutes the inverter 306, and this circuitry develops a signal to render a transistor 332 conductive only upon the production of the signal $\overline{(N+1)}$ in its negative state which occurs when the signal $(N+1)$ is zero. Therefore, the transistor 332 translates the signal from the B brush in the presence of the signal $\overline{(N+1)}$ in its negative state, and the transistor 322 translates the signal from the B* brush in the presence of the signal $(N+1)$ in its negative state.

The transistors 322 and 332 may also form the "or" network 308 so that the desired output signal "N" is produced at the output terminal 310. As noted above, this output signal may be represented by the logical equation:

$$N=\overline{(N+1)}B+(N+1)B^*$$

The control circuit of FIGURE 12 serves to connect the groups of brushes associated with the "f" function tracks and with the "g" function tracks of the two information disks to two different groups of output terminals. The function of this control circuit is such that digital signals corresponding to the sine wave of FIGURE 7 are derived at one of the groups of output terminals, and digital output signals corresponding to the cosine wave of FIGURE 7 are derived at the other group of output terminals.

In FIGURE 12, the brush associated with the least significant track 100 (FIGURE 5) of the "f" function is designated as the brush $f_8$. This brush is positioned on the index line of the high speed disk 46. The brushes $f_7$–$f_1$ represent the unstarred ones of the double brushes respectively associated with the information tracks 102, 104, 106, 108, 120, 122 and 128 (FIGURES 5 and 6) of the "f" function. These latter brushes, as noted, are displaced on one side of the index line of each of the disks 32 and 46. Likewise, the brushes $f^*_7$–$f^*_1$ represent the starred ones of the double brushes respectively associated with the "f" function information tracks enumerated above, and which are displaced on the other side of the index lines. The brush $f_0$ is positioned on the index line, and this brush engages the segment 200 (FIGURE 5) corresponding to the full scale bit of the "$f$" function.

The brushes "$f_7$" and "$f^*_7$" are connected to the input terminals of a double brush logic block 350. This block, and the other double brush logic blocks to be described, each may incorporate circuitry corresponding to the logic systems of FIGURES 11A and 11B.

Likewise, the brushes "$f_6$" and "$f^*_6$" are connected to respective input terminals of a double brush logic block 352, the brushes "$f_5$" and "$f^*_5$" are connected to the respective input terminals of a double brush logic 354, the brushes "$f_4$" and "$f^*_4$" are connected to the input terminals of a double brush logic block 356, the brushes "$f_3$" and "$f^*_3$" are connected to the input terminals of a double brush logic block 358, the brushes "$f_2$" and "$f^*_2$" are connected to the input terminals of a double brush logic block 362, and the brushes "$f_1$" and "$f^*_1$" are connected to the input terminals of a double brush logic block 362.

The brush "$f_8$" is connected to a further input terminal of the block 350 and to a terminal $F_8$. In the like manner, the blocks 350, 352, 354, 356, 358, 360 and 362 are respectively connected to a plurality of terminals $F_7$, $F_6$, $F_5$, $F_4$, $F_3$, $F_2$ and $F_1$. The terminals $F_7$ and $F_6$ are connected to input terminals, respectively, of the blocks 352 and 354. The output terminal $F_5$ is connected to the input terminal of the blocks 356, 358, 360 and 362.

The brush "$f_0$" which contacts the full scale bit segment 200, like the brush "$f_8$," is disposed on the index line, as noted above. The brush "$f_0$" is connected to an "and" network "384," and the brush "$f_8$" is connected to an inverter 386. The "and" network 384 and the inverter network 386 may be similar to the networks described above in conjunction with FIGURES 11A and 11B. The output terminal of the inverter network 386 is also connected to the "and" network 384, and the output terminal of the "and" network 384 is connected to a terminal $F_0$.

As the information disks 32 and 46 are rotated, a plurality of digital signals appear across the terminals $F_8$–$F_0$ in increasing ordinal significance from terminal to terminal. These signals represent the "$f$" function of FIGURE 8 and correspond to the signals produced by the "$f$" brushes. The signals are corrected by the double brush logic blocks 350, 352, 354, 356, 358, 360 and 362 in the manner described in conjunction with FIGURES 11A and 11B to resolve reading ambiguities. Therefore, the digital signals appearing across the terminals $F_8$–$F_0$ are corrected signals corresponding to the "$f$" curves of FIGURE 8.

The brushes associated with the tracks corresponding to the "$g$" curve of FIGURE 8 are designated in FIGURE 12 as $g_8$, $g_7$, $g^*_7$, $g_6$, $g^*_6$, $g_5$, $g^*_5$, $g_4$, $g^*_4$, $g_3$, $g^*_3$, $g_2$, $g^*_2$, $g_1$, $g^*_1$, and $g_0$. The $g_8$ brush is a single brush, and it is disposed on the index line of the disk 46 to contact the segments in the least significant track 110 corresponding to the "$g$" curve. Likewise, the brush $g_0$ is a single brush disposed on the index line of the disk 46, and this brush contacts the segment 202 corresponding to the full scale bit segment in the "$g$" function tracks. The brushes $g_7$–$g_1$, $g^*_7$–$g^*_1$ engage respective ones of the "$g$" function tracks 112, 114, 116, 118, 124, 126, and 130 on the disks 46 and 32. The $g_8$ brush represents the least significant digit, and the brushes $g_7$–$g_1$, $g^*_7$–$g^*_1$ increase in significance as the subscripts decrease. The brush $g_0$ represents the full scale digit.

The brush $g_8$ is connected to a terminal $g_8$. The brushes $g_7$ and $g^*_7$ are connected respectively to the input terminals of a double brush logic block 370, the brushes $g_6$ and $g^*_6$ are connected respectively to the input terminals of a double brush logic block 372, the brushes $g_5$ and $g^*_5$ are connected respectively to the input terminals of a double brush logic block 374, the brushes $g_4$ and $g^*_4$ are connected respectively to the input terminals of a double brush logic block 376, the brushes $g_3$ and $g^*_3$ are connected respectively to the input terminals of a double brush logic block 378, the brushes $g_2$ and $g^*_2$ are connected respectively to the input terminals of a double brush logic block 380, and the brushes $g_1$ and $g^*_1$ are connected respectively to the input terminals of a double brush logic block 382. The circuitry of each of these blocks may be similar to the logic system of FIGURES 11A and 11B.

The output terminals of the blocks 370, 372, 374, 376, 378, 380 and 382 are connected respectively to a plurality of terminals $G_7$, $G_6$, $G_5$, $G_4$, $G_3$, $G_2$ and $G_1$. In the same manner as output terminals $F_7$–$F_2$ are severally connected to the several blocks 352–362 the output terminals $G_7$ is connected to the input of blocks 372, terminal $G_6$ to blocks 374 and terminal $G_5$ to the input terminals of blocks 376, 378, 380 and 382.

The brush $g_0$ associated with the full scale bit segment 202 (FIGURE 5) connected to an "and" network 388. The terminal $F_0$ is connected to an inverter network 390, and the brush $g_8$ is connected to an inverter network 392. The inverter network 392 is connected to the "and" network 388, and the output terminal of the "and" network 388 is connected to an input terminal of an "and" network 394. The output terminal of the inverter 390 is connected to another input terminal of the "and" network 394. The output terminal of the "and" network 394 is connected to a terminal $G_0$.

As the information disks 32 and 46 are rotated, a plurality of digital signals appear across the terminals $G_8$–$G_0$ in increasing ordinal significance from terminal to terminal. These digital signals represent the "$g$" function of FIGURE 8 and correspond to the signals produced by the "$g$" brushes. The latter signals are corrected by the double brush logic blocks 370, 372, 374, 376, 378, 380 and 382 to resolve reading ambiguities. Therefore, the digital signals appearing across the terminals $G_8$–$G_0$ are corrected signals corresponding to the "$g$" curves of FIGURE 8.

As described above, the full scale bit segment 200 of the "$f$" function is engaged by the "$f_0$" brush to produce a signal representing a binary "1" during the last stage of each revolution of the high speed disk 46 and when the output signals at the other "$f$" brushes drops to "0" due to the negative shift described in conjunction with FIGURES 9A and 9B. This full scale bit segment physically overlaps the last conductive segment of the least significant "$f$" track 100. To resolve reading ambiguities the output signals from the brush "$f_0$" should occur only during the interval between the termination of the last conductive segment in the least significant "$f$" track 100 and the engagement of the first conductive segment in that track by the brush "$f_8$." To achieve this, the brush "$f_0$" is connected to the "and" network 384, and the signal from the brush "$f_8$" is introduced through the inverter 386 to the "and" network 384. Therefore, the "and" network 384 is conditioned for conduction only when the least significant "$f$" function digital signal is zero, and a signal is translated by the "and" network 384 during that interval and when the signal at the brush "$f_0$" goes negative representing a conductive segment. This means that the digital output signal at the terminal $F_0$ designates a binary "1" at the precise interval between the termination of brush engagement with the last least significant "$f$" segment and the commencement of engagement with the first least significant "$f$" segment.

The full scale bit conductive segment 202 corresponding to the "$g$" function is made to overlap the full scale bit segment 200 of the "$f$" function. However, the brush "$g_0$" which engages the "$g$" segment 202 is to translate a signal to the terminal $G_0$ only upon the reading termination of the full scale "$f$" segment 200 and the beginning of the first least significant "$g$" segment. For these reasons, the signal at the terminal $F_0$ is introduced through the inverter 390 to the "and" network 394 to assure that no signal will be translated to the terminal $G_0$ until the termination of the contact of the brush "$f_0$" with the "$f$" segment 200. Likewise, the least significant digit signal from the brush $g_8$ is introduced through the inverter 392 to the "and" network 388 to assure that no signal will be passed to the "and" network 394 except when the least significant digit of the "$g$" curve is "0." This provides that the signal at the terminal $G_0$ occurs only for the desired interval at the beginning of the "$g$" function between the termination of the brush engagement with the "$f$" segment 200 and the beginning of the brush engagement with the first segment in the least significant track 110 of the "$g$" function.

It follows, therefore, that the signals appearing across the terminals $F_8$–$F_0$ represent a 9-digit binary number which has a functional relation with the analogue quantity represented by the angular position of the low speed information member 32 (FIGURE 6) as represented by the curve "$f$" of FIGURE 8. Likewise, the digital signals appearing across the terminals $G_8$–$G_0$ represent a 9-digit binary number corresponding to the analogue quantity represented by the angular position of the low speed information disk 32 in accordance with the function represented by the "$g$" curve of FIGURE 8. Also, and as described above, the digital signals appearing across these terminals repeat for each rotation of the high speed information disk 46 and each quadrant of rotation of the low speed information disk 32. The digital signals appearing across these terminals must now be appropriately switched to provide the desired sine and cosine functions at the output terminals of the apparatus for each complete revolution of the low speed information disk 32.

The desired switching is under the control of the brushes $Q_1$, $Q_2$ and $Q_3$, collectively represented by the numeral 60 in FIGURE 3, associated with the switching tracks 132, 134 and 136 on the low speed information disk 32. The arrangement is such, that none of the Q brushes contact any of the switching segments for the first quadrant of rotation of the low speed information disk, the $Q_1$ brush contacts a conductive segment for the second quadrant of rotation of the low speed disk, the $Q_2$ brush contacts a conductive segment for the third quadrant, and the $Q_3$ brush contacts a conductive segment for the fourth quadrant. To resolve reading ambiguities, the double brush system referred to above is also used in the switching tracks. Therefore, the first switching track 132 is engaged by a pair of brushes $Q_1$ and $Q^*_1$ on either side of the index line of the low speed disk 32. In like manner, the other switching tracks 134 and 136 are respectively engaged by the brushes $Q_2$ and $Q^*_2$ and by the brushes $Q_3$ and $Q^*_3$.

The brushes $Q_1$ and $Q^*_1$ are connected respectively to a pair of input terminals of a double brush logic block 396, the brushes $Q_2$ and $Q^*_2$ are connected respectively to pair of input terminals associated with a double brush logic block 397, and the brushes $Q_3$ and $Q^*_3$ are connected respectively to a pair of input terminals associated with a double brush logic block 398. The blocks 396, 397, 398 may utilize double-brush logic circuitry of the type described in conjunction with FIGURES 11A and 11B. The latter double brush logic blocks are all under the control of the digital signal appearing at the terminal $F_0$. Under the control of the signal at the terminal $F_0$, an unstarred Q brush is selected whenever the signal at the terminal $F_0$ represents "0," and a starred Q brush is selected whenever that signal represents "1."

As the low speed disc 32 rotates through the first quadrant, none of the Q brushes engages a conductive segment in their respective switching tracks. Just before the end of the first quadrant, however the leading $Q_1$ brush crosses the transition to the conductive segment in the switching track 132. At this time, the signal at the terminal $F_0$ represents "1" so that the lagging brush $Q^*_1$ is activated. However, at precisely the end of the first quadrant the signal at $F_0$ represent "0" and the leading brush $Q_1$ (which has now safely crossed to the conductive segment) is activated.

In the manner described above, each of the brushes $Q_1$, $Q_2$ and $Q_3$ is selected at the proper time by the double brush logic blocks 396, 397 and 398 to provide respective corrected readings at the beginning of the second, third and fourth quadrants. The selection is such that reading ambiguities are resolved and the proper indications are obtained at precisely the proper times. By a similar selection of the starred Q brushes at the end of each quadrant by the double brush logic blocks, the transitions from a conductive swtiching segment for a non-conductive switching segment in each of the switching tracks can be precisely timed and controlled.

In the described manner, in the first quadrant of revolution of the low speed information disk 32 there is no output switching signal. At precisely the start of the second quadrant of revolution of that disk, an output switching signal $Q'_1$ is developed at the output terminal of the block 396. At the precise beginning of the third quadrant of revolution of the low speed disk, an output switching signal $Q'_2$ is developed at the output terminal of the block 397; and at precisely the start of the third quadrant of revolution of the low speed disk, an output switching signal $Q'_3$ is developed at the output terminal of the block 398. These output signals are also controlled by the double brush system to terminate at the proper times so as to correspond only to the precise quadrant which they represent.

As described above, the sine function output signal is positive for the first two quadrants of revolution of the low speed information disk 32, and this output signal is negative for the third and fourth quadrants. The signals $Q'_2$ and $Q'_3$ are introduced to respective input terminals of an "or" network 400, the output terminal of which is connected to an indicator 402. When either of the signals $Q'_2$ or $Q'_3$ occur, the low speed information disk is in the third or fourth quadrants. During those quadrants the sine function output signal is negative, and the indicator 402 glows or otherwise reacts to indicate that fact.

Likewise, the signals $Q'_1$ and $Q'_2$ occur respectively when the low speed information disk is in the second and third quadrants. Also, the cosine function is negative in the second and third quadrants. The signals $Q'_1$ and $Q'_2$ are introduced to an "or" network 404, and this "or" network is connected to an indicator 406. The indicator 406, therefore, indicates when the low speed information disk is in the second or third quadrants to show that the cosine function output signal is negative.

As also described above, the "$f$" curve is selected in the first quadrant for the sine function output signal, the "$g$" curve is selected in the second quadrant, the "$f$" curve is selected in the third quadrant, and the "$g$" curve is selected in the fourth quadrant of that output signal. Alternately, for the cosine function output signal, the "$g$" curve is selected in the first quadrant, the "$f$" curve is selected in the second quadrant, the "$g$" curve is selected in the third quadrant and the "$f$" curve is selected in the fourth quadrant. This switching is carried out in the following manner:

The terminals $F_8$–$F_0$ are connected respectively to a plurality of "and" networks 410, 412, 414, 416, 418, 420, 422, 424, and 426. Likewise, the terminals $G_8$–$G_0$ are connected respectively to a plurality of "and" networks 430, 432, 434, 436, 438, 440, 442, 444 and 446. The terminals $F_8$–$F_0$ are also respectively connected to a plurality of "and" networks 450, 452, 454, 456, 458, 460, 462, 464 and 466. In like manner, the output terminals $G_8$–$G_0$ are respectively connected to a plurality of "and" networks 470, 472, 474, 476, 478, 480, 482, 484 and 486.

The output terminal of the block 396 is connected to an input terminal of an "or" network 490, and the output terminal of the block 398 is connected to another input terminal of this "or" network. The output terminal of the "or" network 490 is connected to an inverter 492, and this output terminal is also connected to an input terminal of each of the "and" networks 470, 472, 474, 476, 478, 480, 482, 484, 486 and of each of the "and" networks 450, 452, 454, 456, 458, 460, 462, 464 and 466. The output terminal of the inverter 492, on the other hand, is connected to an input terminal of each of the "and" networks 410, 412, 414, 416, 418, 420, 422, 424, 426 and 430, 432, 434, 436, 438, 440, 442, 444 and 446.

It will be appreciated that the "or" network 490 develops an output signal: $Q_c = Q'_1 + Q'_3$. This output signal is developed in the second and fourth quadrants of revolution of the low speed disk. It will be remembered that the "f" signals are to be translated to the cosine output terminals, and the "g" signals are to be translated to the sine output terminals, during these second and fourth quadrants.

Likewise, the inverter 492 develops a signal $Q_s = \overline{Q}'_1 \overline{Q}'_3$. This latter signal is developed in the first and third quadrants of revolution of the low speed information disk, at which time the "f" signal is to be swicthed to the sine output terminals and the "g" signal is to be switched to the cosine output terminals.

The "and" networks 410 and 470 are connected to respective input terminals of an "or" network 500, the "and" networks 412 and 472 are connected to respective input terminals of an "or" network 502, the "and" networks 414 and 474 are connected to respective input terminals of an "or" network 504, the "and" networks 416 and 476 are connected to respective input terminals of an "or" network 506, the "and" networks 418 and 478 are connected to respective input terminals of an "or" network 508, the "and" networks 420 and 480 are connected to respective input terminals of an "or" network 510, the "and" networks 422 and 482 are connected to respective input terminals of an "or" network 512, the "and" networks 424 and 484 are connected to respective input terminals of an "or" network 514, and the "and" networks 426 and 486 are connected to respective input terminals of an "or" network 516.

The "or" networks 500, 502, 504, 506, 508, 510, 512, 514, and 516 are respectively connected to a plurality of sine function output terminals designated sine 8, sine 7, sine 6, sine 5, sine 4, sine 3, sine 2, sine 1, and sine 0. The sine wave output signal appears in digital form across these output terminals. The least significant digit appears at the sine 8 terminal and the most significant digit appears at the sine 0 terminal. For the first quadrant of revolution of the low speed disk, the "f" signals from the terminals $F_8$–$F_0$ are translated to corresponding ones of these sine output terminals through the "and" networks 410, 412, 414, 416, 418, 420, 422, 424, and 426. This occurs again at the third quadrant, at which time the indicator 402 glows to indicate that the sine function is negative. For the second quadrant, the signals from the terminals $G_8$–$G_0$ are translated to these sine output terminals through the "and" networks 470, 472, 474, 476, 478, 480, 482, 484, and 486. This is repeated for the fourth quadrant, at which time the indicator 402 again glows to indicate that the sine function is negative.

The "and" networks 430, and 450 are connected to respective input terminals of an "or" network 520, the "and" networks 432 and 452 are connected to respective input terminals of an "or" network 522, the "and" networks 434 and 454 are connected to respective input terminals of an "or" network 524, the "and" networks 436 and 456 are connected to respective input terminals of an "or" network 526, the "and" networks 438 and 458 are connected to respective input terminals of an "or" network 528, the "and" networks 440 and 460 are connected to respective input terminals of an "or" network 530, the "and" networks 442 and 462 are connected to respective input terminals of an "or" network 532, the "and" networks 444 and 464 are connected to respective input terminals of an "or" network 534, and the "and" networks 446 and 466 are connected to respective input terminals of an "or" network 536.

The "or" networks 520, 522, 524, 526, 528, 530, 532, 534, and 536 are respectively connected to a plurality of cosine function output terminals designated respectively cos 8, cos 7, cos 6, cos 5, cos 4, cos 3, cos 2, cos 1 and cos 0. The digital output signals corresponding to the cosine function appear across these latter output terminals. The signal corresponding to the least significant digit appears at the output terminal cos 8, and the signal corresponding to the most significant digit appears at the output terminal cos 0.

During the first quadrant of revolution of the low speed disk, the signals from the terminals $G_8$–$G_0$ are translated through the "and" networks 430, 432, 434, 436, 438, 440, 442, 444 and 446 to the cosine output terminals. Then, during the second quadrant of revolution of the low speed disk the signals from the terminals $F_8$–$F_0$ are translated through the "and" networks 450, 452, 454, 456, 458, 460, 462, 464 and 466 to these cosine output terminals. During this latter translation, the indicator 406 glows to indicate a negative cosine function. The signals from the terminals $G_8$–$G_0$ are again translated to the cosine output terminals during the third quadrant, and the indicator 406 continues to glow representing a negative cosine function. Finally, during the fourth quadrant of revolution of the low speed disk the signals from the terminals $F_8$–$F_0$ are again translated to the cosine function output terminals to complete the cycle of the cosine function.

It will be seen from the previous discussion that the brushes or their equivalents operate as "switching means" to control the production of output signals. The brushes or the equivalents also act as "receiving means" since they receive signals from conductive portions in the coupled tracks. It will also be seen that the conductive segments in each track are conductive only relative to the nonconductive portions between the conductive segments. For example, both the conductive and nonconductive segments may be conductive, but the conductive segments may be raised to engage the brushes, whereas the nonconductive segments may be lowered to prevent such contact. Because of this term the "conductive" as used in the claims is intended to have a broad connotation. Furthermore, the "conductive" segments may be designated as "first" segments and the spacing between the conductive segments may be designated as "second" segments.

The invention provides, therefore, a novel improved and compact converter for converting analogue quantities into trigonometric functions as represented by digital output signals. As noted above, the use of the double brush technique described herein enables a pair mechanically coupled disks to be used without affecting the electrical precision of the unit.

I claim:

1. In an analogue-to-digital converter, an information member having first and second pluralities of tracks, there being a plurality of first and second segments alternately disposed in each of the tracks in the first and second pluralities, the first and second segments in each track having progressive lengths with progressive distances along the track, the lengths of the first segments at corresponding positions in the different tracks of the first plurality being of progressive values and the lengths of the first segments at corresponding positions in the different tracks of the second plurality being of progressive values, the tracks of the second plurality being arranged in a complementary relationship with respect to the tracks of the first plurality.

2. An analogue-to-digital converter, including, means including a first information member movable through a particular distance on a cyclic basis and constructed to provide at each position on the first information member a first plurality of signals digitally representing a first trigonometric function and representing the first quadrant of the first trigonometric function in each such recurrent movement of the information member and to provide at each position on the first information member a second plurality of signals digitally representing a second trigonometric function complementary to the first trigonometric function and representing the first quadrant of the second trigonometric function in each such recurrent movement of the information member, means coupled to the first information member for sensing the particular recurrent movement of the information member to indicate the quadrant of the first trigonometric function at any instant, and means coupled to the sensing means for selecting the first plurality of signals or the second plurality of signals at each instant in accordance with the signals produced by the sensing means to represent the quadrant of the first trigonometric function at that instant.

3. An analogue-to-digital converter, including, a first information member rotatable to different positions and constructed to provide first signals digitally representing a quadrant of a first trigonometric function in a complete revolution of the member and to provide second signals digitally representing a quadrant of a second trigonometric function in the complete revolution of the member wherein the second trigonometric function has a particular relationship to the first trigonometric function, a second information member rotatable to different positions and constructed to provide second signals representing quadrants of the first trigonometric function in each complete revolution of the information member, means coupled to the first and second information members for rotating the first and second information members on a synchronous basis to obtain a quadrant indication of the first trigonometric function, and means including electrical circuitry coupled to the first and second information members for selecting the first and second signals from the first information member to represent the first trigonometric function on a continuous basis and for selecting the first and second signals in accordance with the signals obtained from the second information member to represent the quadrant, and means including electrical circuitry coupled to the second information member for providing signal indications representing the polarity of the first and second signals in accordance with the signals obtained from the second information member to represent the quadrant.

4. An analogue-to-digital converter, including, means including a first movable information member constructed to provide first pluralities of signals digitally representing a first trigonometric function upon progressive displacements of the member and to provide second pluralities of signals digitally representing a second trigonometric function having a particular phase relationship to the first function, means including a second movable information member coupled to the first information member and constructed to provide signals digitally representing the quadrant of the first trigonometric function upon progressive displacements of the second member, means coupled to the first and second information members for moving the first and second members on a synchronous basis and at a particular rate with respect to each other, and means including electrical circuitry coupled to the first and second information members for selecting the first and second pluralities of the signals from the first information member in accordance with the signals obtained from the second information member to represent the quadrant to provide signal indications representing a particular trigonometric function on a continuous basis.

5. An analogue-to-digital converter, including, an information member having first and second pluralities of tracks, there being a plurality of first and second segments alternately disposed in each of the tracks in the first and second pluralities, the information member being movable in a recurrent pattern, the first and second segments in each track in the first plurality having progressive lengths with progressive movements of the information member, the lengths of the first and second segments in the different tracks in the first plurality having a progressive relationship to one another at corresponding positions in the different tracks, the first and second segments in each track in the second plurality having progressive lengths with progressive movements of the information member, the lengths of the first and second segments in the different tracks in the second plurality having a progressive relationship to one another at corresponding positions in the different tracks, the tracks in the second plurality having a complementary relationship to the tracks in the first plurality with progressive movements of the information member, and means responsive to the movements of the information member in the recurrent pattern to select the tracks in the first plurality or the tracks in the second plurality for the production of signals and to produce output signals in accordance with the disposition of the tracks in the selected plurality and in representation of a continuous function.

6. In an analogue-to-digital converter, a rotatable information member having first and second pluralities of tracks disposed in a concentric relationship on the member, each track on the member having a plurality of conductive and nonconductive segments disposed in an alternate relationship in the track, the conductive segments in each track in the first plurality increasing in a gradual pattern with successive displacements of the member in the rotary direction and the conductive segments in each track in the second plurality decreasing in a gradual pattern with successive displacements of the member in the rotary direction, the conductive segments in the different tracks in the first plurality having a minimum length different on a progressive basis from the minimum lengths of the conductive segments in the other tracks and increasing in length from this minimum value to a maximum value different on a progressive basis from the maximum lengths of the conductive segments in the other tracks, and the conductive segments in the different tracks in the second plurality having a maximum length different on a progressive basis from the maximum lengths of the conductive segments in the other tracks and decreasing in length from this maximum value to a minimum value different on a progressive basis from the minimum lengths of the conductive segments in the other tracks.

7. An analogue-to-digital converter, including, a rotatable information member having first and second pluralities of tracks disposed in a concentric relationship on the member, each track on the member having a plurality of conductive and non-conductive segments disposed in an alternate relationship in the track, the conductive segments in the tracks in the first plurality having lengths progressively increasing in the rotary direction between minimum and maximum values wherein the minimum lengths in the different tracks in the first plurality have progressive values relative to one another and the maximum lengths in the different tracks in the first plurality have progressive values relative to one another, the conductive segments in the tracks in the second plurality having lengths progressively decreasing in the rotary direction between maximum and minimum values wherein the maximum lengths in the different tracks in the second plurality have progressive values relative to one another and the minimum lengths in the different tracks in the second plurality have progressive values relative to one another, means coupled to the information member for producing a rotation of the information member, switching means coupled to the conductive segments in the different tracks in the first and second pluralities for producing signals in accordance with the disposition of the switching means relative to the conductive segments in the coupled track, means coupled to the switching means and responsive to the particular revolution of the information member for selecting the switching means coupled to the tracks in the first plurality or the switching means coupled to the tracks in the second plurality for the production of signals.

8. The converter set forth in claim 7, including, means responsive to the selection of the switching means coupled to tracks in the first plurality or the switching means coupled to the tracks in the second plurality and responsive to the particular revolution of the information member for providing signal indications representing the polarity of the digital indications obtained from the selected switching means.

9. An analogue-to-digital converter, including, an information member having a first plurality of tracks and a second plurality of tracks, each track in the first and second pluralities including a plurality of first segments and a plurality of second segments alternately disposed in the tracks relative to the first segments, the first and second segments in each track having progressive lengths at progressive positions along the track, the segments in the tracks of the first plurality being disposed to have decreasing lengths at progressive positions along the tracks to provide digital indications as to a first trigonometric relationship and the segments in the tracks of the second plurality being disposed to have increasing lengths at progressive positions along the tracks of the second plurality to provide digital indications as to a second trigonometric relationship, a first plurality of switching means disposed in coupled relationship to the first and second segments in the different tracks in the first plurality to produce signals in accordance with the disposition of the switching means relative to the segments in the tracks, a second plurality of switching means disposed in coupled relationship to the first and second segments in the different tracks in the second plurality to produce signals in accordance with the disposition of the switching means relative to the segments in the tracks, means including electrical circuitry responsive to the displacements of the information member relative to the switching means in the first and second pluralities to activate the switching means in the first and second pluralities in accordance with such displacements for the production of output signal indications representing a particular trigonometric function on a continuous basis, means including electrical circuitry responsive to the displacements of the information member relative to the switching means in the first and second pluralities to provide output indications representing the polarity of the indications provided by the activated ones of the switching means in the first and second pluralities.

10. The converter set forth in claim 9 in which the segments in each track in the first plurality have minimum and maximum lengths different in a particular relationship from the minimum and maximum lengths of the other tracks in the first plurality and in which the segments in each track in the second plurality have minimum and maximum lengths different in a particular relationship from the minimum and maximum lengths of the other tracks in the second plurality and in which the switching means in the first plurality are paired and in which each pair of switching means in the first plurality is disposed in coupled relationship to the segments in a different one of the tracks in the first plurality and in which the switching means in the second plurality are paired and in which each pair of switching means in the second plurality is disposed in coupled relationship to a different one of the tracks in the second plurality and in which means including electrical circuitry is coupled to the switching means in the first plurality to select a particular one of the switching means in each such pair upon an activation of the switching means in the first plurality and in accordance with the output signal indications obtained from the switching means previously selected in the first plurality and in which means including electrical circuitry is coupled to the switching means in the second plurality to select a particular one of the switching means in each such pair upon an activation of the switching means in the second plurality and in accordance with the output signal indications obtained from switching means previously selected in the second plurality.

11. An analog-to-digital converter comprising a coded information member having two series of tracks with alternate segments in each track representing binary digits, at least one readout element associated with each of said tracks for providing a digital indication of the relative position of said information member, one series of tracks being coded to represent one quadrant of a trigonometric function for each complete revolution, the second series of tracks being coded to represent one quadrant of a complementary trigonometric function which corresponds to another quadrant of said first trigonometric function, a second coded information member associated with said first information member and having a plurality of switching tracks with alternate segments in each track representing the four quadrants in a complete trigonometric function, at least one readout element associated with each of said switching tracks for providing an indication of the particular quadrant and polarity of the complete trigonometric function, and means associated with said readout elements for providing a digital output representing a continuous trigonometric function for each revolution of said second information member.

12. An analog-to-digital converter as set forth in claim 11 wherein said second information member is also provided with two series of tracks with alternate segments in each track representing more significant binary digits in both of said trigonometric functions.

13. An analog-to-digital converter as set forth in claim 11 wherein the analog zero position is shifted in a negative direction with respect to both of said tracks by an angular increment corresponding to one-half of one of said segments in the least significant digit track.

14. An analog-to-digital converter as set forth in claim 11 wherein two additional tracks are provided on said first information member with a segment in each track representing an additional more significant digit for each of said trigonometric functions between a zero analog position and another position where a maximum binary count is indicated by said other tracks, and a readout element associated with each of said additional tracks, one of said readout elements being controlled by the segments in the corresponding least significant digit track and the other readout element associated with the second additional track being controlled by said first additional readout element and the segments in the other least significant digit track.

15. In an analog-to-digital converter the improvement comprising a coded information member having two series of tracks with alternate segments in each track representing binary digits, one series of tracks being coded to represent one quadrant of a trigonometric function for each complete revolution, the second series of tracks being coded to represent one quadrant of a complementary trigonometric function which corresponds to another quadrant of said first trigonometric function.

16. The improvement in an analog-to-digital converter as set forth in claim 15 wherein the analog zero position is shifted in a negative direction with respect to both of said tracks by an angular increment corresponding to one-half of one of said segments in the least significant digit track.

17. The improvement in an analog-to-digital converter as set forth in claim 15 wherein two additional tracks are provided on said first information member with a segment in each track representing an additional more significant digit for each of said trigonometric functions between a zero analog position and another position where a maximum binary count is indicated by said other tracks.

18. In an analog-to-digital converter the improvement comprising a coded information member having two series of tracks with alternate segments in each track representing binary digits, one series of tracks being coded to represent one quadrant of a trigonometric function repeated four times for each complete revolution, a second series of tracks being coded to represent one quadrant of the complementary trigonometric function which corresponds to another quadrant of said first trigonometric function and repeated four times for each complete revolution, a plurality of switching tracks on said member with alternate segments in each track representing four quadrants in a complete trigonometric function.

References Cited in the file of this patent

UNITED STATES PATENTS

| | | |
|---|---|---|
| 2,436,178 | Rajchman | Feb. 17, 1948 |
| 2,747,797 | Beaumont | May 29, 1956 |
| 2,750,584 | Goldfischer | June 12, 1956 |
| 2,766,445 | Bland | Oct. 9, 1956 |
| 2,779,539 | Darlington | Jan. 29, 1957 |
| 2,792,545 | Kamm | May 14, 1957 |
| 2,822,130 | Nolde et al. | Feb. 4, 1958 |
| 2,866,184 | Gray | Dec. 23, 1958 |

FOREIGN PATENTS

| | | |
|---|---|---|
| 650,913 | Great Britain | Mar. 7, 1951 |

OTHER REFERENCES

"Analog-Digital Converter Design," Electronic Equipment, August 1955, pp. 12 and 13 relied upon.

"Digital Techniques in Analog Systems," Meyer, I.R.E. Transitions—Electronic Computers, pp. 23–29 relied on.

"I.R.E. Transactions on Instrumentation," June 1956, pp. 161–167.